United States Patent [19]

Golben

[11] 4,227,681
[45] Oct. 14, 1980

[54] SILVER RECOVERY CARTRIDGE FOR USED FIXER OF NEUTRAL OR HIGHER PH

[75] Inventor: Michael Golben, St. Paul, Minn.

[73] Assignee: Minnesota Mining and Manufacturing Company, St. Paul, Minn.

[21] Appl. No.: 51,367

[22] Filed: Jun. 25, 1979

[51] Int. Cl.$^3$ .............................................. C22B 11/04
[52] U.S. Cl. .................................... 266/170; 266/111; 75/109; 75/118 P
[58] Field of Search ................. 75/109, 118 P, 118 R; 266/111, 170

[56] References Cited

U.S. PATENT DOCUMENTS

| | | | |
|---|---|---|---|
| 35,842 | 7/1862 | Shaw | 266/170 |
| 576,118 | 2/1897 | Heathman | 266/170 |
| 2,643,108 | 6/1953 | Lieberman | 266/170 |
| 3,369,801 | 2/1968 | Hartman | 75/118 P X |
| 3,744,995 | 7/1973 | MacKay | 75/118 P X |
| 3,792,845 | 2/1974 | Larson | 266/170 |
| 4,156,604 | 5/1979 | Fisch et al. | 266/170 X |

*Primary Examiner*—G. Ozaki
*Attorney, Agent, or Firm*—Cruzan Alexander; Donald M. Sell; James B. Marshall, Jr.

[57] ABSTRACT

A method and article for substantially preventing premature obstruction to flow in a canister of a silver recovery device comprising placing a porous pad at the inlet surface of the metallic filler of the canister.

1 Claim, No Drawings

SILVER RECOVERY CARTRIDGE FOR USED FIXER OF NEUTRAL OR HIGHER PH

This invention relates to a method and device for the prevention of premature obstructions to flow in a silver recovery device.

During the processing of silver halide photographic materials, silver is carried out of the photographic elements and into solution, particularly the fix and bleach/fix solutions. Numerous devices have been developed for removing the silver from spent solutions. One such device utilizes a container within which is positioned a metallic filler, e.g., U.S. Pat. No. 3,369,801. The container is connected to the photographic processing unit so that the spent silver containing solution flows completely through the container holding the metallic filler prior to the solution being sewered or returned to a mixing tank. While the solution is being circulated, the silver is deposited throughout the metallic filler. This type of system utilizes an electronic transfer which occurs between the more and less noble metals in order to recover silver in the spent solution. The less noble metal (i.e., the metallic filler) in this type of recovery unit is usually iron in the form of inexpensive steel wool. When the silver rich solution is passed over the iron, an electron exchange occurs wherein the iron metal ($Fe^o$) is oxidized to ferrous ($Fe^{+2}$) or ferric ($Fe^{+3}$) ion and the silver ion ($Ag^+$) is reduced to silver metal ($Ag^o$).

With more aggressive acidic solutions (pH 4 to 6) and with the neutral but aggressive bleach-fix solutions plating takes place in the interior as well as the inlet surfaces of the steel wool and the filamentary structure of the steel wool is quickly disintegrated by dissolution, corrosion, and the physical effects of embrittlement. While these effects contribute to early loss of capacity for silver recovery, they also serve to maintain flow pathways for the solution, making unnecessary the insertion of a porous pad as herein described.

It has been found in the use of such silver recovery devices when the silver-containing solution is neutral or slightly alkaline (pH of 6 to 8) that a dense impermeable layer of silver tends to form at the inlet side of the steel wool which prematurely obstructs the flow before all the steel wool can be utilized. Electrons which are released by action of the fixer solution upon the steel wool in the interior of the cartridge are conducted to the region where silver-rich solution first enters the steel wool. There the silver ions are reduced and silver is preferentially plated on silver already deposited. This highly localized deposition leads to pore blockage and stoppage of flow.

The present invention substantially prevents premature obstruction to flow by the introduction of a porous pad at the inlet surface of the metallic filler within a silver recovery device.

The present invention may be described as a silver recovery cartridge having an inlet port, an outlet port, and a metallic filler therein where the improvement comprises a porous pad adapted to be positioned against a substantial portion of the surface of the metallic filler nearest the incoming silver containing solution.

It is believed that the mechanism by which the porous pad prevents premature obstruction to the flow is that of providing a three-dimensional support network for the growth of the silver dendrites, thereby allowing for the maintenace of flow pathways for the incoming solution. Dendrites tend to form because the points at which silver is newly deposited are the most electrolytically energetic, and more silver deposits on these points preferentially, forming growing needles of silver. If these needles are not directed away from the surface of the metallic filler, they will be impacted at the surface by the incoming stream, resulting in early blockage of flow.

The blockage-preventive device is preferably comprised of a porous pad-shaped structure. The material may be any substance which (1) is chemically inert to the chemicals present in the photographic fixing solution, i.e., thiosulfates, buffers, silver salts, (2) does not release pollutants to the influent streams, and (3) can be formed into porous pads having sufficient mechanical integrity to support, if need be, the weight of the steel wool spool.

The preferred materials for use as porous pads of the present invention are wood products, expanded paper, lofted cellulose fibers, glass wool, nylon webbing, resin bonded sawdust, polypropylene padding, etc. The materials can be electronically conductive as well as non-conductive. Porous carbons may also be used. The pad is shaped to fit within the container of the silver recovery device in contact with and fully covering the metallic filler preferably near the solution inlet side. The pad should have at least an in place thickness of $\frac{1}{4}$ inch with a thickness of about $\frac{1}{2}$ inch being preferred. Although thicker pads may be utilized, it has been found that if the thickness exceeds $\frac{1}{2}$ inch, no proportionate benefit is obtained.

If an "apparent pad density" (Dp) is defined as weight per unit volume, with weight in grams and volume in cubic centimeters of the space occupied by the pad as positioned in the silver recovery device, then an acceptable value of Dp is between $0.0650 \times Dm$ and $0.0033 \times Dm$, wherein Dm is the density of the solid material of which the pad is constructed in grams per cubic centimeter. It has been found when the pad is too porous (e.g., cellulose, with a Dp less than 0.005 g/cc), there will be insufficient filamentary support for silver dendritic deposition, while too dense a structure, i.e., Dp greater than 0.1 g/cc (e.g., cellulose of $Dm \approx 1.52$), prevents free dendritic structure growth leading to early obstruction of liquid passages and premature flow blockage. The preferred "apparent density" range is about $0.0065 \times Dm$ to $0.0033 \times Dm$.

The cartridge of the present invention may be placed in contact with either the top or bottom of the metallic filler, the positioning being dependent on the direction of flow of the silver-rich spent fixer stream. This positioning allows the spent solution to pass through the porous pad whereby the silver ions are reduced and deposited on the material of the pad in a manner which is governed by the orientation of the material.

What is claimed is:

1. A cartridge for the substantial prevention of the premature obstruction to the flow of the incoming spent solution in a silver recovery device having a metallic filler comprising a porous pad adapted to be positioned against a substantial portion of the surface of said metallic filler nearest the incoming silver containing solution, whereby said pad provides a three-dimensional support network for the growth of the silver dendrites such that flow pathways for incoming solutions are maintained.